United States Patent Office 3,341,284
Patented Sept. 12, 1967

3,341,284
HIGH-SILICA MOLECULAR SIEVE ZEOLITES
Dean Arthur Young, Yorba Linda, Calif., assignor to Union Oil Company of California, Los Angeles, Calif., a corporation of California
No Drawing. Filed Feb. 17, 1964, Ser. No. 345,111
7 Claims. (Cl. 23—112)

This invention relates to new and economical methods for the manufacture of certain crystalline, aluminosilicate molecular sieve zeolites. Specifically, the invention is concerned with the manufacture of Y sieve zeolites (synthetic faujasites) having a relatively high $SiO_2/Al_2O_3$ mole-ratio of between about 3.9 and 6.

The principal object of the invention is to provide, in the synthesis of such zeolites from aqueous sodium aluminate-silica mixtures, a more economical source of silica than has been previously used. Heretofore it has been considered essential in such syntheses to employ a finely divided colloidal silica such as silica hydrosol or silica hydrogel as the principal source of silica. It has now been discovered however that a much more inexpensive, noncolloidal form of silica may be employed with equal advantage, namely any of the various naturally occurring siliceous deposits commonly referred to as diatomaceous earth, infusorial earth, kieselguhr, tripoli and the like, all of which materials are designated herein by the generic term "diatomite." In broad aspect, the method of manufacture consists simply in digesting the diatomite at relatively high temperatures with added sodium hydroxide, sodium aluminate and water, until the desired degree of crystallization has taken place, usually several hours.

The invention is also concerned with new zeolite mixtures prepared by these methods, which mixtures may comprise in addition to the Y sieve zeolite, other amorphous zeolites which are unique in that they retain the highly porous structure of the initial diatomite. The invention also embraces hydrocracking catalysts and processes utilizing the zeolite mixtures.

Molecular sieve zeolites of the Y crystal type are described in Belgian Patent Nos. 598,582, 598,682, 598,-683 and 598,686. These zeolites, though possessing a definite single crystal form, can be prepared so as to display significant differences in chemical composition, notably as to zeolitic cations present, and the $SiO_2/Al_2O_3$ mole-ratio in the crystal lattice. The general formula for the sodium zeolites is expressed as follows:

where $X=0$ to about 9 and $W=3.0$ to about 6.

The sodium in the above formula can be replaced by numerous other cations, and an unusual feature of these zeolites is that the sodium can be exchanged with ammonium ion, and the resulting ammonium zeolite heated to decompose the ammonium ion, leaving a stable, isomorphic hydrogen form of the zeolite (which is sometimes referred to as being "decationized").

The Y molecular sieve zeolites are useful in many industrial applications. They can be used as adsorbents to separate mixtures of compounds or to purify gas streams. They can also be used as catalysts, or bases for catalysts. In particular, it has recently been discovered that these Y molecular sieves in their hydrogen form, or in a divalent metal form such as the magnesium zeolite, are useful catalysts for isomerization, cracking, and particularly for hydrocracking. For purposes of hydrocracking or isomerization a hydrogenating metal such as palladium, platinum, or nickel is added thereto, as by impregnation or ion-exchange.

The present invention is concerned specifically with Y sieve zeolites which are particularly useful as hydrocracking catalyst bases. For purposes of hydrocracking (and other acid-catalyzed reactions such as isomerization) it is desirable to use the Y zeolites having a relatively high $SiO_2/Al_2O_3$ mole-ratio of, e.g., between about 3.9 and 6. These high-silica zeolites are more stable, and produce a much more satisfactory catalyst than the zeolites having a lower $SiO_2/Al_2O_3$ mole-ratio.

The Y sieve zeolites having a $SiO_2/Al_2O_3$ mole-ratio of about 2.5 to 3.9 can be relatively cheaply prepared by methods described in Belgian Patent No. 577,642, which in general involves digesting aqueous solutions of sodium silicate and sodium aluminate at elevated temperatures, after an initial low temperature aging treatment. The raw materials required for manufacturing these low-silica zeolites are relatively inexpensive. However, all attempts to prepare high-silica Y sieve zeolites, having a $SiO_2/Al_2O_3$ mole-ratio above about 3.9, directly from sodium silicate solutions have been unsuccessful.

The only successful methods heretofore described in the art for the manufacture of high-silica Y zeolites have required as the major starting material a colloidal form of silica, usually a highly purified silica hydrosol. These hydrosols, as exemplified by the commercial "Ludox," are prepared by extensive ion-exchanging of sodium silicate solutions. The resulting silica hydrosols are several times as costly as sodium silicate, on an equivalent $SiO_2$ basis. According to the present invention, the use of colloidal silica is eliminated, and the major starting material is a relatively inexpensive natural diatomite.

Diatomite deposits found at various localities differ somewhat in their chemical composition, but generally they will assay between about 85 and 95% by weight of $SiO_2$, the remainder being alumina, iron oxides, alkaline earth oxides and the like. Their particle size distribution is predominantly in the 0.5–20 micron range. These raw diatomites may be employed in their natural state without initial treatment or purification. It is preferred however to subject such diatomites to an initial acid-washing treatment as for example with hydrochloric acid, to remove most of the nonsiliceous impurities. It is further preferred that the acid-washed material be calcined at temperatures of about 500° to 1,000° F. In calcining the diatomite however, the temperature should not be allowed to rise above about 1,200° F., for at high temperatures the highly porous amorphous silica is transformed into a more dense crystalline form of silica, alpha cristobalite. It has been found that this latter material does not yield significant quantities of the Y zeolite when utilized in the process described herein, but instead yields other completely different zeolites.

Another precaution to be observed in pretreating the diatomite, is to avoid any treatments with aqueous caustic solutions. It has been found that where the diatomite is first pretreated with aqeous sodium hydroxide solutions, the yield of Y sieve zeolite may be substantially reduced, and the product generally has a lower $SiO_2/Al_2O_3$ ratio. Hence, the excess sodium hydroxide which is used in the digestion step should either be premixed with the aqueous sodium aluminate solution before addition of the diatomite, or it should be added to the diatomite-sodium aluminate mixture.

The formation of the desired zeolite involves simply the mixing of the required reactants, i.e., water, sodium aluminate, sodium hydroxide and diatomite, followed by digesting the mixture at relatively high temperatures, e.g., 85–120° C. for about 2–100 hours or more. The proportions of the individual ingredients employed should be such as to bring the mixture within the following composition ranges:

TABLE 1.—MOLE-RATIOS OF COMPONENTS FOR CRYSTALLIZATION OF ZEOLITE

|  | Operative | Preferred |
| --- | --- | --- |
| $Na_2O/SiO_2$ | 0.2–0.6 | 0.25–0.45 |
| $SiO_2/Al_2O_3$ | 6–30 | 10–20 |
| $H_2O/Na_2O$ | 18–60 | 22–40 |

In order to reduce the volume of the mixture to a minimum for economical handling, it is normally preferred to use as little water as possible, within the above ranges. This sometimes presents a difficulty because the diatomite is a fluffy absorbent material which will take up large amounts of water, with the formation of a thick viscous mud which is difficult to agitate when preparing the reaction mixtures. It has been found that this difficulty may be overcome by first mixing the diatomite with a portion of the total water required in the final mixture, sufficient to provide about a 4/1 to about 7/1 water silica mole-ratio, then subjecting the viscous mud to a crushing, stirring action for about 20–30 minutes, whereupon the consistency of the mix breaks down, forming a thin liquid slurry which can then be mixed with the remaining materials.

It is sometimes found that higher yields of Y sieve zeolite can be obtained if the high-temperature digestion period is preceded by a low-temperature aging period, wherein the slurry mixture is allowed to stand at about 10–50° C. for about 1–72 hours. At the end of this low-temperature aging period, the mixture is then heated up to the digestion temperatures of 85–120° C., whereupon crystallization occurs within about 2 to 100 hours. The resulting crystal slurry is then filtered and the filter cake washed with distilled water and dried according to conventional procedures.

The zeolite compositions prepared as above described ordinarily comprise about 35–70% by weight of crystalline material conforming to the X-ray diffraction pattern for Y zeolites. The remaining material in the mixture comprises amorphous zeolitic alumino-silicates which are very porous in character and themselves possess desirable adsorptive and catalytic properties.

In the data presented herein, the percentage of zeolite Y in the solid product is determined by means of quantitative X-ray and/or adsorption measurements referred to standard zeolite Y samples as follows:

$$\frac{I_1}{I_2} \times 100 = \text{percent zeolite Y}$$

where $I_1$ = Sum of intensities of suitable X-ray lines measured on the zeolite Y sample, and
$I_2$ = Sum of intensities of the same X-ray lines measured on the pure zeolite Y reference standard.

The sodium zeolite crystals prepared as above described are basically three-dimensional frameworks of $SiO_4$ and $AlO_4$ tetrahedra cross-linked by the sharing of oxygen atoms. The electrovalence of each tetrahedron containing aluminum is balanced by the presence in the alumino-silicate framework of a cation such as sodium ion. The void spaces in the framework are occupied by water molecules.

The high silica-to-alumina mole ratio in these zeolites is believed to be due to the substitution in the crystal lattice of $Si^{+4}$ for $Al^{+3}$ ions during the synthesis process. The $Al^{+3}$ ion is larger (radius=0.57 A.) than the $Si^{+4}$ ion (radius=0.39 A.). As the silica/alumina mole-ratio increases, the smaller $SiO_4$ tetrahedra substitute for the larger $AlO_4$ tetrahedra, and there is a small but real decrease in the unit cell volume as indicated by the value of the crystal lattice constant, $a_0$. Thus, for zeolite Y compositions having $SiO_2/Al_2O_3$ mole ratios ranging from about 3.9 up to about 6.0 the unit cell constant, $a_0$, changes from 24.77 A. to about 24.52 A. If the high $SiO_2/Al_2O_3$ ratios found in these compositions were merely due to the presence of amorphous or nonstructural $SiO_2$, no variation in the cell dimension $a_0$ would be observed.

Measurement of the lattice constant, $a_0$, by means of careful X-ray spectrometer scanning, therefore provides a reliable method for determining the structural $SiO_2/Al_2O_3$ ratio of zeolite Y products made by the process of the invention, the relationship between the lattice constant and $SiO_2/Al_2O_3$ content having been established.

Because of the observed decrease in unit cell dimensions with increasing $SiO_2/Al_2O_3$ ratio, there is necessarily a small concomitant shift observed in the positions of particular interplanar or $d$-spacings which characterize these zeolite Y compositions, according to the well known relationship for a cubic crystal:

$$d_{h,k,l} = a_0 / \sqrt{h^2 + k^2 + l^2}$$ 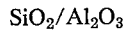

where $h$, $k$ and $l$ are the Miller indices. Occasionally, minor variations in intensities and/or positions of the lines or peaks in the X-ray diffraction patterns of the herein described sodium zeolite Y compositions may be observed, due to variables such as the particular X-ray technique and/or apparatus employed, orientation of the powder crystals, the degree of hydration thereof, etc., but nevertheless they all conform to the pattern essentially as shown in Table 2 below.

The values for the interplanar spacing, $d$, are expressed in Angstrom units (A.). The relative intensities of the lines of the X-ray powder diffraction pattern are expressed on the relative basis of 100 for the strongest peak. The X-ray powder diffraction pattern data of Table 2 were obtained on a Geiger counter spectrometer with pen recorder using filtered copper K-alpha radiation $$(\lambda = 1.54050 \text{ A.})$$

TABLE 2.—X-RAY DIFFRACTION PATTERN OF Na-Y-ZEOLITE

| $h^2+k^2+l^2$ | $d$, A. | Relative Intensity |
| --- | --- | --- |
| 3 | 14.15–14.65 | 100 |
| 8 | 8.67–8.85 | 18 |
| 11 | 7.39–7.53 | 14 |
| 19 | 5.62–5.71 | 42 |
| 27 | 4.72–4.79 | 17 |
| 32 | 4.33–4.40 | 28 |
| 40 | 3.88–3.93 | 8 |
| 43 | 3.74–3.79 | 41 |
| 44 | 3.72–3.75 | 4 |
| 48 | 3.54–3.58 | 3 |
| 51 | 3.43–3.48 | 5 |
| 56 | 3.28–3.32 | 27 |
| 59 | 3.19–3.24 | 6 |
| 67 | 3.00–3.04 | 12 |
| 72 | 2.89–2.93 | 16 |
| 75 | 2.83–2.88 | 35 |
| 80 | 2.74–2.78 | 12 |
| 83 | 2.69–2.73 | 4 |
| 88 | 2.61–2.65 | 11 |
| 91 | 2.57–2.61 | 5 |
| 108 | 2.36–2.39 | 7 |

When the sodium zeolites of this invention are converted to hydrogen zeolites, or to other zeolitic metal forms, they still conform with slight displacements to the above diffraction pattern. The persistence of the same crystal form in the hydrogen zeolites is a distinguishing characteristic of the Y sieve zeolites; the crystal structure of other molecular sieve zeolites, e.g., the X type, completely collapses upon conversion to the hydrogen form.

To convert the sodium zeolites prepared as above described to active hydrocracking and isomerization catalysts, they are subjected to suitable ion-exchange treatments to produce compositions wherein the zeolitic cations are mainly hydrogen and/or a polyvalent metal. The hydrogen zeolites are prepared by ammonium ion-exchange followed by heating, as described in Belgian Patent No. 598,683. The polyvalent metal forms, e.g., magnesium or calcium zeolites, are prepared by ion-exchange with suitable polyvalent metal salts, as described in Belgian Patent No. 598,682. The preferred polyvalent metals are the divalent metals, and particularly the divalent metals of Groups II-A and II-B.

The active hydrogen zeolites, or polyvalent metal zeolites possess the required acid function for cracking and isomerization, it is necessary to incorporate a minor proportion of a suitable hydrogenating component, e.g., a Group VIII metal. The preferred hydrogenating metals comprise the Group VIII noble metals, and particularly palladium, platinum or rhodium. To incorporate these metals by ion exchange, the zeolite, either in a metal form or the ammonium form, is digested with an aqueous solution of a suitable compound of the desired metal wherein the metal is present in a cationic form, followed by reducing to form the free metal as described for example in Belgian Patent No. 598,686.

The finished catalysts are useful for the hydrocracking of mineral oil fractions boiling between about 300° and 1,000° F., to produce desired lower boiling hydrocarbons, e.g., gasoline, jet fuel, etc. Suitable hydrocracking conditions fall within the general ranges:

TABLE 3

|  | Operative | Preferred |
|---|---|---|
| Temperature,°F | 400–850 | 500–750 |
| Pressure, p.s.i.g | 300–5,000 | 750–2,000 |
| LHSV | 0.1–10 | 0.5–5 |
| $H_2$/oil ratio, s.c.f./B | 1,000–20,000 | 2,000–12,000 |

The following examples are cited to illustrate the invention, but are not to be construed as limiting in scope.

*Example I*

A sample of raw, uncalcined diatomite (Johns Manville "Filter Cel"), having a particle size range predominantly in the 4–6 micron range, was refluxed overnight with an excess of 19% hydrochloric acid, washed until neutral and then dried at 100° C. Three batches of the acid washed material were then digested at 100° C. with aqueous sodium hydroxide-sodium aluminate mixtures of varying composition, and the resulting solid products were washed, dried and subjected to X-ray powder diffraction analysis to determine the proportion of Y sieve present, and its $SiO_2/Al_2O_3$ mole-ratio. The results were as follows:

TABLE 4

| Batch | Mole-Ratios of Reaction Mixtures | | | Aging Time, Hrs. | Wt.-percent Y Sieve in Product | $SiO_2/Al_2O_3$, Mole-Ratio |
|---|---|---|---|---|---|---|
|  | $Na_2O/SiO_2$ | $SiO_2/Al_2O_3$ | $H_2O/Na_2O$ | | | |
| A | 0.39 | 9.0 | 27 | 60 | 39 | |
| B | 0.39 | 13.0 | 27 | 60 | 61 | 4.3 |
| C | 0.46 | 13.0 | 24 | 24 | 57 | 3.9 |

In another analogous series of preparations using the raw diatomite without acid washing, a maximum of about 34% Y sieve was produced, thus demonstrating the efficacy of acid washing.

*Example II*

Another large batch of the acid-washed diatomite prepared in Example I was calcined for 2 hours at 430° C., and the calcined material was then utilized in three analagous Y sieve preparations involving the same aging at 100° C. with aqueous sodium hydroxide-sodium aluminate solutions. The results were as follows:

TABLE 5

| Batch | Mole-Ratios of Reaction Mixtures | | | Aging Time, Hrs. | Wt.-percent Y Sieve in Product | $SiO_2/Al_2O_3$, Mole-Ratio |
|---|---|---|---|---|---|---|
|  | $Na_2O/SiO_2$ | $SiO_2/Al_2O_3$ | $H_2O/Na_2O$ | | | |
| D | 0.39 | 9.0 | 27 | 60 | 65 | 4.5 |
| E | 0.39 | 13.0 | 27 | 60 | 62 | 5.0 |
| F | 0.46 | 13.0 | 24 | 24 | 50 | 4.1 |

It is evident that calcining the acid-washing diatomite materially improves its tendency to form Y sieve having high $SiO_2/Al_2O_3$ ratios, at least from those reactant mixtures where the $Na_2O/SiO_2$ ratio is below about 0.4. It is further evident that the best combination of Y sieve yield and product $SiO_2/Al_2O_3$ ratio is obtained where the reactant $Na_2O/SiO_2$ ratio is between about 0.25 and 0.45, and the $SiO_2/Al_2O_3$ reactant ratio is between about 10 and 20.

*Example III*

This example illustrates the preparation and use of hydrocracking catalysts from the sodium zeolites prepared as described in Example II.

A portion of the batch "D" sodium zeolite prepared in Example II is subjected to exhaustive ion-exchange with aqueous ammonium chloride solution until the $Na_2O$ content is reduced to below about 2% by weight. The resulting ammonium zeolite is then washed and subjected to further ion exchange by digesting with a solution of tetrammine palladium chloride to deposit 0.5% by weight palladium. The resulting product is then filtered, washed, dried, compressed into ¼" pellets, and calcined at 900° F. in order to convert the Pd-$NH_4$ zeolite to the Pd-hydrogen form.

Tht resulting catalyst is then employed for hydrocracking a 400–800° F. boiling range hydrofined gas oil, the hydrocracking conditions being: Pressure 1,000 p.s.i.g.; 1.5 LHSV; and 8,000 s.c.f. of hydrogen per barrel of feed. Under these conditions, after the catalyst has been on-stream for about 30 hours, a 50% conversion to 400° F. end-point gasoline is obtained at temperatures in the range of about 520–560° F. This activity is essentially equivalent to that of analogous catalysts prepared starting with the more expensive silica hydrosol.

It is not intended that the invention should be limited to the details described above since many variations may be made by those skilled in the art without departing from the scope or spirit of the following claims:

I claim:

1. A method for the manufacture of a molecular sieve zeolite of the Y crystal type which comprises forming a reaction mixture consisting essentially of water, an amorphous diatomite, sodium hydroxide and sodium aluminate, wherein the mole-ratios of the components fall within the ranges:

$Na_2O/SiO_2$—0.2–0.6
$SiO_2/Al_2O_3$—6–30
$H_2O/Na_2O$—18–60 and wherein said diatomite forms the principal source of $SiO_2$ therein; digesting said reaction mixture at an elevated temperature for a sufficient length of time to form a substantial proportion of a sodium Y molecular sieve zeolite having a $SiO_2/Al_2O_3$ mole-ratio greater than about 3, and recovering said zeolite from the reaction mixture.

2. A method as defined in claim 1 wherein said amorphous diatomite is predominantly in the form of particles in the size range of about 0.5–20 microns.

3. A method as defined in claim 1 wherein said amorphous diatomite has been previously acid-washed prior to use in said reaction mixture.

4. A method as defined in claim 1 wherein said amorphous diatomite has been previously acid washed and then calcined at temperatures between about 500° and 1,000° F., prior to use in said reaction mixture.

5. A method as defined in claim 1 wherein the mole-ratios of reactant components in said reaction mixture fall within the following ranges:

$Na_2O/SiO_2$—0.25–0.45
$SiO_2/Al_2O_3$—10–20
$H_2O/Na_2O$—22–40.

6. A method for the manufacture of a molecular sieve zeolite of the Y crystal type having a $SiO_2/Al_2O_3$ mole-ratio greater than about 3.9, which comprises:
  (A) mixing an amorphous diatomite with water in proportions to provide about 4–7 moles of water per mole of $SiO_2$, thereby forming a stiff pasty mixture;
  (B) subjecting said pasty mixture to a crushing, stirring action for a sufficient length of time to reduce it to a thin slurry;
  (C) mixing said thin slurry with an aqueous solution of sodium aluminate and sodium hydroxide, thereby forming a reaction mixture wherein the mole-ratios of the components fall within the ranges:

$Na_2O/SiO_2$—0.2–0.6
$SiO_2/Al_2O_3$—6–30
$H_2O/Na_2O$—18–60 and wherein said diatomite forms the principal source of $SiO_2$ therein; digesting said reaction mixture at an elevated temperature for a sufficient length of time to form a substantial proportion of a sodium Y molecular sieve zeolite having a $SiO_2/Al_2O_3$ mole-ratio greater than about 3.9, and recovering said zeolite from the reaction mixture.

7. A method as defined in claim 6 wherein the mole-ratios of reactant components in said reaction mixture fall within the following ranges:

$Na_2O/SiO_2$—0.25–0.45
$SiO_2/Al_2O_3$—10–20
$H_2O/Na_2O$—22–40.

References Cited

UNITED STATES PATENTS

| | | |
|---|---|---|
| 1,840,450 | 1/1932 | Jaeger et al. |
| 3,130,006 | 4/1964 | Rabo et al. _____ 23—110 |
| 3,130,007 | 4/1964 | Breck _____ 23—110 |

DELBERT E. GANTZ, *Primary Examiner.*

PAUL M. COUGHLAN, *Examiner.*

A. RIMENS, *Assistant Examiner.*